Patented Dec. 23, 1930

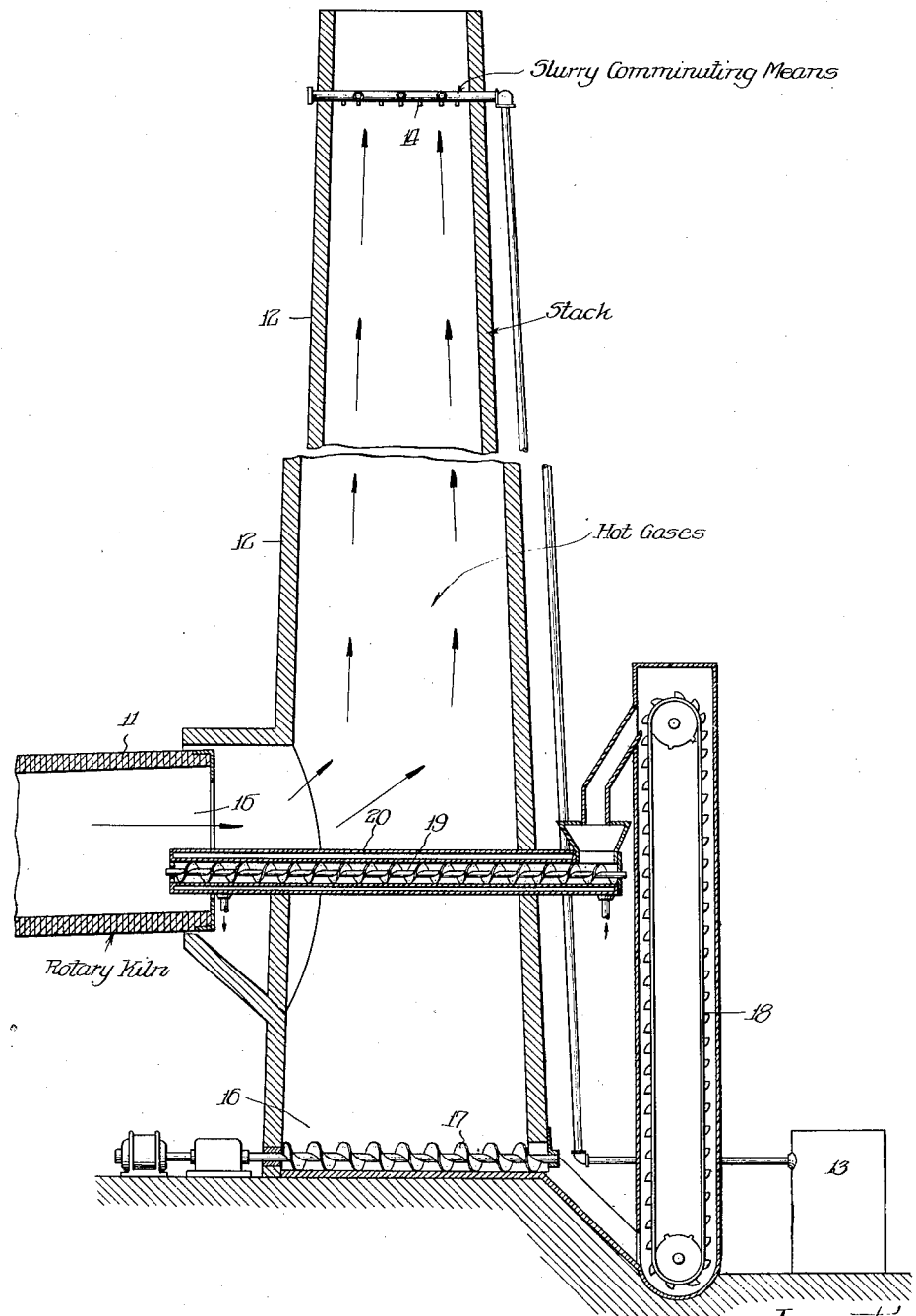

1,786,080

UNITED STATES PATENT OFFICE

RAY C. NEWHOUSE, OF WILMETTE, ILLINOIS

CEMENT MANUFACTURE

Application filed August 13, 1927. Serial No. 212,772.

This invention relates to the manufacture of Portland cement or other similar products which must be heated to high temperature during the process of manufacture. Portland cement may be made either by the dry process in which the raw materials are dried, ground and then submitted to high temperature treatment or by the wet process in which the raw material is prepared in a finely divided form as a slurry. When the wet process is used the slurry usually is fed through a pipe into the upper end of a rotary kiln. This slurry falling on the kiln lining is slowly heated by contact with the lining and the hot gases, and is dried. This drying and dehydrating process will require passage through a substantial portion of the rotary kiln. During passage through the remaining portion of the rotary kiln the dried material is first heated to the calcining temperature and then is heated to the clinkering temperature. The material is finally removed from the lower end of the rotary kiln as a Portland cement clinker. This method is disadvantageous because a considerable part of the rotary kiln is used for drying the slurry and because the exit gases from the rotary kiln retain a large amount of their heat which either has to be recovered by using a waste heat boiler or is allowed to pass into the atmosphere at a high temperature.

Another wet process which is sometimes used causes the slurry to be sprayed into the upper end of the rotary kiln under pressure. In this manner the finely divided material is quickly heated and dried by contact with the hot gases so that less space is required in the kiln for driving away the water. This spray, however, cools the hot gases passing out of the kiln to such a degree that it is necessary to use an artificial draft usually in the form of an exhaust fan. Even in this process a substantial portion of the kiln is used for drying the material.

The object of this invention is to make more effective use of the length of the kiln for heat treating the cementitious material.

Another object of this invention is to more fully utilize the heat of the waste gases from the rotary kiln without objectionally decreasing the draft thereupon.

A further object of this invention is to provide an improved process of treating the raw material before it is introduced to the rotary kiln.

In the preferred embodiment of the present invention the slurry is sprayed under pressure into the stack which is used for conveying away the hot gases from the upper end of the rotary kiln. The spray is first dried and then is heated as it descends through the stack. It falls through the stack countercurrent to the flow of the hot gases with the result that the hottest gases come in contact with the dried material whereas the gases from which a large amount of the heat has been abstracted come in contact with the newly formed spray. The newly formed spray consists of finely divided particles of the aqueous slurry at about normal temperature and being at relatively low temperature in comparison with the partially cooled gases will readily absorb heat therefrom. The ascending gases in the stack, although partially cooled, are sufficiently hot to produce the necessary draft. The dried and heated material may be collected at a point adjacent the entrance of the kiln and introduced thereinto, but in the preferred embodiment of the invention this material is preferably collected at a point below the entrance of the kiln and then is elevated and conveyed thereinto. According to the latter expedient there will be no collecting or conveying devices in front of the kiln opening and it is possible to have a much wider kiln opening and therefore a more effective draft. In the present invention the slurry is dried and the dried material is partially heated before being introduced into the rotary kiln.

The present process not only effectively utilizes the whole length of the rotary kiln for high temperature heat treatment of the material, but it also secures a very effective utilization of the heat of the waste gases with the result that the apparatus has a much greater capacity and also has a high economy. These hot waste gases are utilized both to dry the slurry to a powder and also to preheat it before introduction to the rotary kiln. In a dry process where the material is not preheated before introduction into the kiln the gases will leave the kiln at a temperature of 1400 to 1500° F. Where the material is preheated before introduction into the kiln the temperature of the gases entering the stack will be higher with the result that there will be sufficient heat available not only to dry the material but also to preheat it. In this manner the capacity and efficiency of the kiln will be increased using the wet process and will be superior to the capacity and efficiency when using a dry process.

The amount of water utilized in the slurry depends upon the character of the raw material. Frequently it will vary from about 30 to 40% but occasionally it may be above 50%. The height of the stack in which the waste gases are contacted with the slurry spray and then with the dry powder should be sufficient to enable the slurry to be dried and the resultant powder to be preheated. The height of the stack will be determined by the capacity of the kiln and by the character of its draft. The temperature of the dried preheated material introduced into the kiln will vary over a wide range but usually will be about 600 to 1400° F. Since there is sufficient hot gas in the stack to create an effective draft it is not necessary to employ exhaust fans or artificial draft means.

Upon accompanying diagrammatic drawing is illustrated an arrangement of apparatus which may be used to carry out the process of this invention. The hot gases pass out of the rotary kiln 11 into the stack 12 from the top of which they pass into the atmosphere. The slurry or raw material suspended in water is forced or pumped to a point near the top of the stack from the source 13 (the inlet not being shown) and is then sprayed downwardly into the ascending gases by the nozzles 14. The descending material is first dried and then is further heated until it reaches the lower end of the stack at 16. The dried and heated material is then allowed to collect in the lower part of the stack at 16 and is carried by the screw conveyer 17 to the elevator 18, which elevates it to a point opposite the entrance of the kiln. The dried material is then conveyed into the kiln by the screw conveyer 19 which is provided with a water cooled jacket 20.

I claim:

1. In combination, a rotary cement kiln, a vertical stack for receiving the hot gases from the kiln, into which the open end of the kiln extends, means for introducing a slurry of cementitious material in finely divided form into the upper portion of the stack, means in the lower part of the stack for collecting the dried material and means for conveying this material to, and introducing it into, the open end of the rotary kiln.

2. In combination, a rotary cement kiln, a vertical stack the lower portion of which is provided with an opening to receive the upper end of the kiln and which is adapted to receive and conduct the hot waste gases from the kiln vertically upwardly, means for spraying a slurry of cementitious materials downwardly into the upper portion of the stack, means for collecting the dried slurry below the opening in the lower portion of the stack, and means for conveying such material to, and introducing it into, the mouth of the kiln in the lower part of the stack.

In testimony whereof I have hereunto subscribed my name.

RAY C. NEWHOUSE.